C. M. SCOTT.
Artificial Dams or Dykes.
No. 200,412. Patented Feb. 19, 1878.
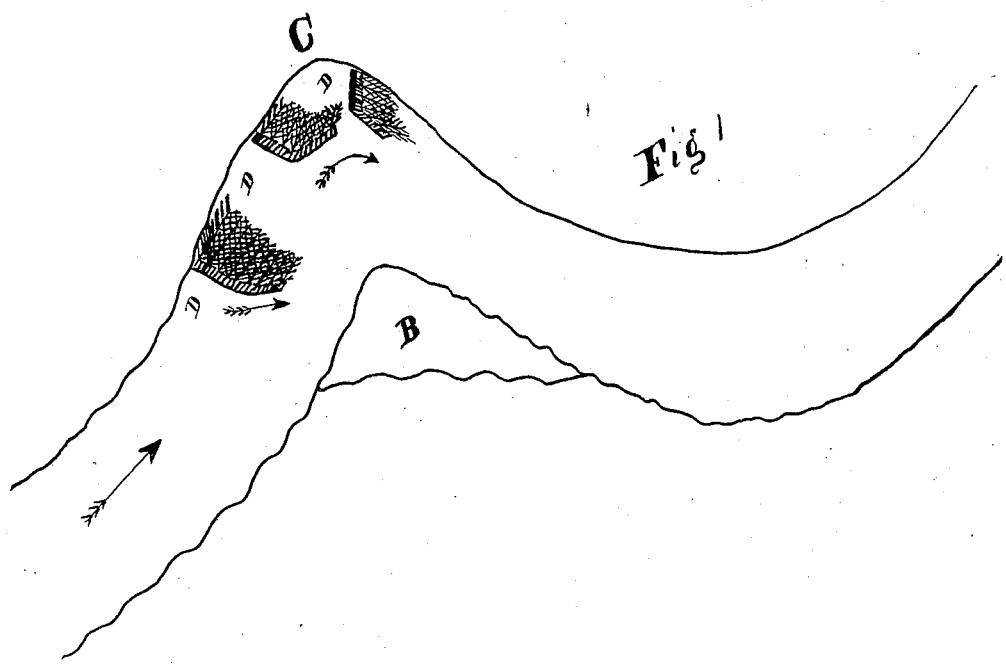
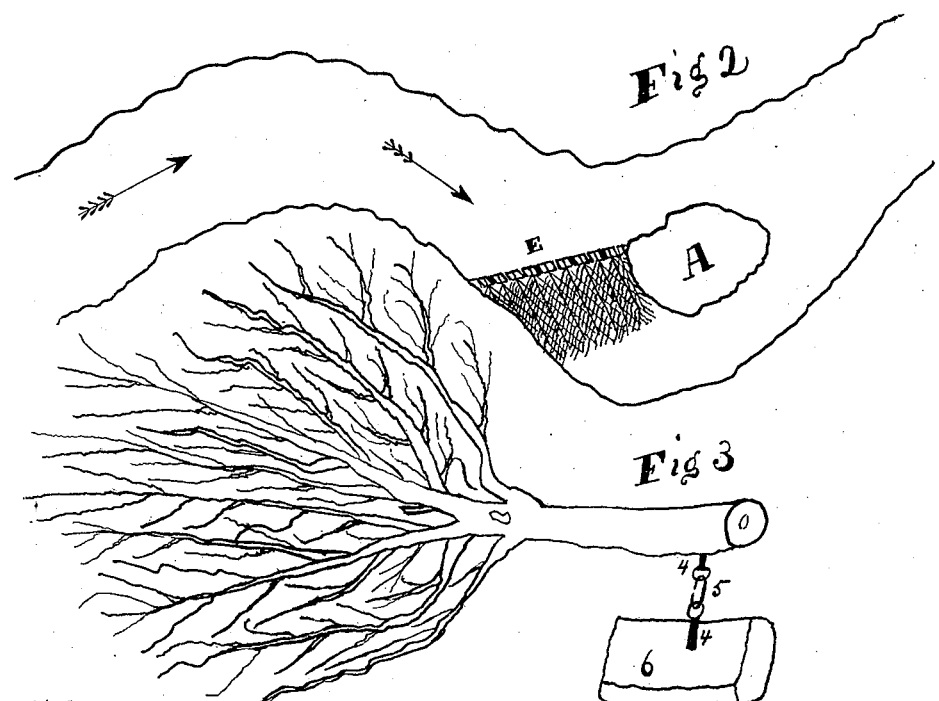

UNITED STATES PATENT OFFICE.

CHARLES M. SCOTT, OF ST. LOUIS, MISSOURI.

IMPROVEMENT IN ARTIFICIAL DAMS OR DYKES.

Specification forming part of Letters Patent No. 200,412, dated February 19, 1878; application filed May 18, 1877.

*To all whom it may concern:*

Be it known that I, CHARLES M. SCOTT, of the city and county of St. Louis, and State of Missouri, have invented a new and useful Artificial Rack-Heap Dam or Dyke, for the purpose of improving and deepening the channels of water-courses, removing sand-bars and other obstructions therefrom, and protecting harbors and the banks of rivers, of which the following is a specification:

My invention consists of the construction, in the manner following, of dams or dykes formed of trees with their branches, as represented in the annexed drawings, for the uses above stated, and for such other uses as the same may be applied to; and my mode of constructing, applying, and using the same is as follows, viz:

Figures 1 and 2 represent sections of a river containing a sand-bar, A, a shore-bar, B, and a bend, C. D D D E represent complete dams or dykes in different positions to illustrate their uses.

My mode of constructing and using the same is as follows: I take an ordinary forest-tree with its branches intact, as represented in Fig. 3, and a large stone, 6, having a hole drilled through it, in which I insert an iron bolt, 4, with a ring on the projecting end. I also insert a similar bolt into the trunk of the tree 3, and connect said two bolts by means of an open link, 5, thus fastening the tree and stone securely together, so that the stone will act as an anchor to retain the tree in the desired position. When the circumstances of the case make it desirable, I connect the tree to the stone with a single bolt passing through both, and dispense with the link. I then sink a tree thus attached to a stone anchor to the river-bed, as close to the shore as possible, with branches pointing down stream, and revet the space, if any, between the butt of the tree and the bank with stone or other material, which will fill up the space and prevent washing; then sink other trees, similarly prepared, outside of and parallel with the first, until a line of trees is formed reaching obliquely from the shore to or a little past the head of the bar A, and, if necessary, place other trees on top of the first row, similarly prepared and secured, till the dam is high enough to effect the desired object, viz., the turning of the force of the current from its accustomed channel, so as to cause the same to strike the head of the bar and continue along the outer side of the same, and thus, by gradual abrasion, wear it away. (See letter F.) The weight of the stone anchor causes the butt of the tree to sink into the mud and sand on the bottom and become permanently fixed. The interstices between the trunks of the trees and between the branches of the same will allow a sufficient quantity of water to pass through the dam to form a slight current below, not sufficiently strong to prevent the deposit of sediment, but strong enough to prevent the formation of eddies, which cut and undermine ordinary dams when a large volume of water flows over them.

If the object is to remove a shore-bar, such as B, for instance, I build my dam in the same manner as shown at E in the drawing, except that for this purpose I commence on the opposite shore (in slack water if possible) at a sufficient distance above the bar, extend the same at right angles with the shore until it strikes the current; then curve the same so as to direct the current away from the shore and toward the bar, as shown on the drawing at D D D, thus throwing the current against the bar, and causing it to cut the same away. If necessary, I multiply the number of dams to meet all emergencies.

If the object is to protect a harbor or bank, I construct any number of dams required in precisely the same manner last described, reaching out from the shore, as represented in the bend C, in such a manner that the dams will turn the current from the shore and cause slack water behind and between them, thus preventing abrasion of the bank and allowing a deposit of sediment to fill up the spaces between and behind the dams, thereby forming a permanent protection to the bank.

I claim as my invention and desire to secure by Letters Patent—

The construction of dams and dykes by means of trees, with their branches in their natural state, as represented, in combination with anchors arranged as shown, and for the purpose herein described.

CHARLES M. SCOTT.

Witnesses:
 WM. A. KING,
 A. H. GOFF.